(12) United States Patent     (10) Patent No.:   US 12,698,182 B2

Stolt et al.             (45) Date of Patent:      Aug. 4, 2026

(54) METHODS FOR IDENTIFYING AT LEAST ONE PARAMETER OF A PERMANENT MAGNET MOTOR OF AN ELEVATOR, ELEVATOR DRIVE UNITS, AND ELEVATORS

(71) Applicant: KONE Corporation, Helsinki (FI)

(72) Inventors: Lauri Stolt, Helsinki (FI); Mikko Paakkinen, Helsinki (FI); Tuukka Kauppinen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1563 days.

(21) Appl. No.: 17/184,715

(22) Filed: Feb. 25, 2021

(65) Prior Publication Data

US 2021/0300722 A1     Sep. 30, 2021

(30) Foreign Application Priority Data

Mar. 27, 2020    (EP) .................................... 20166224

(51) Int. Cl.
| | |
|---|---|
| *B66B 1/30* | (2006.01) |
| *B66B 1/32* | (2006.01) |
| *H02P 6/08* | (2016.01) |

(52) U.S. Cl.
CPC .............. *B66B 1/304* (2013.01); *B66B 1/306* (2013.01); *B66B 1/32* (2013.01); *H02P 6/085* (2013.01)

(58) Field of Classification Search
CPC ........... B66B 1/304; B66B 1/306; B66B 1/32; B66B 1/30; B66B 5/0087; H02P 6/085;
(Continued)

(56) References Cited

U.S. PATENT DOCUMENTS

| | | | | | |
|---|---|---|---|---|---|
| 5,838,126 | A | * | 11/1998 | Llerena | .................. G05B 19/42 |
| | | | | | 160/293.1 |
| 5,883,344 | A | * | 3/1999 | Colby | .................. H03H 9/1035 |
| | | | | | 318/807 |

(Continued)

FOREIGN PATENT DOCUMENTS

WO     WO 2009/130363 A1     10/2009

OTHER PUBLICATIONS

Rong Dong, Comparison and Analysis of Inductances of Interior Permanent Magnet Machine with Two Different Rotor Structures, 2016, IEEE, 232-237 (Year: 2016).*

(Continued)

*Primary Examiner* — Bickey Dhakal
(74) *Attorney, Agent, or Firm* — Birch, Stewart, Kolasch & Birch, LLP

(57)          ABSTRACT

A method for identifying parameters, such as a magnetization-axis and torque-axis inductances, of a permanent magnet motor of an elevator includes applying, such as by a brake controller, at least one hoisting machinery brake to prevent rotation of a rotor of the permanent magnet motor, determining, by a first method, a mean value of motor inductance, as well as the magnetization-axis inductance and the torque-axis inductance as relative inductance values based on the mean value, determining, by a second method, being different than the first method, a mean value of motor main inductances, and determining absolute values of the magnetization-axis and the torque axis inductances based on the motor main inductance obtained by the second method and the relative inductance values obtained by the first method.

19 Claims, 4 Drawing Sheets

(58) Field of Classification Search
CPC ......... H02P 6/186; H02P 6/185; G01R 27/08;
G01R 27/2611; G01R 31/343; G01R
31/346
See application file for complete search history.

(56) References Cited

U.S. PATENT DOCUMENTS

| 2010/0252379 | A1* | 10/2010 | Piech | B66D 5/30 |
| | | | | 188/161 |
| 2017/0104432 | A1* | 4/2017 | Jebai | H02P 23/0077 |
| 2017/0222677 | A1 | 8/2017 | Anderson et al. | |
| 2021/0226568 | A1* | 7/2021 | Landsmann | H02P 6/185 |

OTHER PUBLICATIONS

European Search Report of application 20 16 6224, dated Nov. 11, 2020.

* cited by examiner

400

START

410 APPLY A HOISTING MACHINERY BRAKE TO PREVENT ROTATION OF A ROTOR OF A PERMANENT MAGNET MOTOR OF AN ELEVATOR

420 DETERMINE, BY A FIRST METHOD, A MEAN VALUE OF MOTOR INDUCTANCE, AND A MAGNETIZATION-AXIS AND A TORQUE-AXIS INDUCTANCES RELATIVELY TO THE MEAN VALUE

430 DETERMINE, BY A SECOND METHOD, A MEAN VALUE OF MOTOR MAIN INDUCTANCES

440 DETERMINE ABSOLUTE VALUES OF THE MAGNETIZATION-AXIS AND THE TORQUE-AXIS INDUCTANCES BY MEANS OF THE MOTOR MAIN INDUCTANCES OBTAINED BY THE SECOND METHOD AND THE RELATIVE INDUCTANCE VALUES OBTAINED BY THE FIRST METHOD

450 STOP

FIG. 4

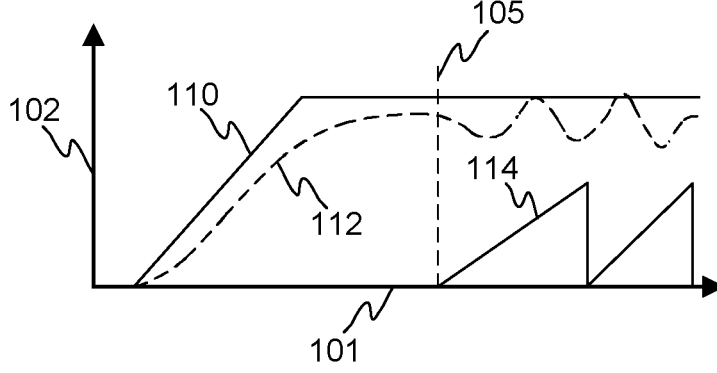

FIG. 5

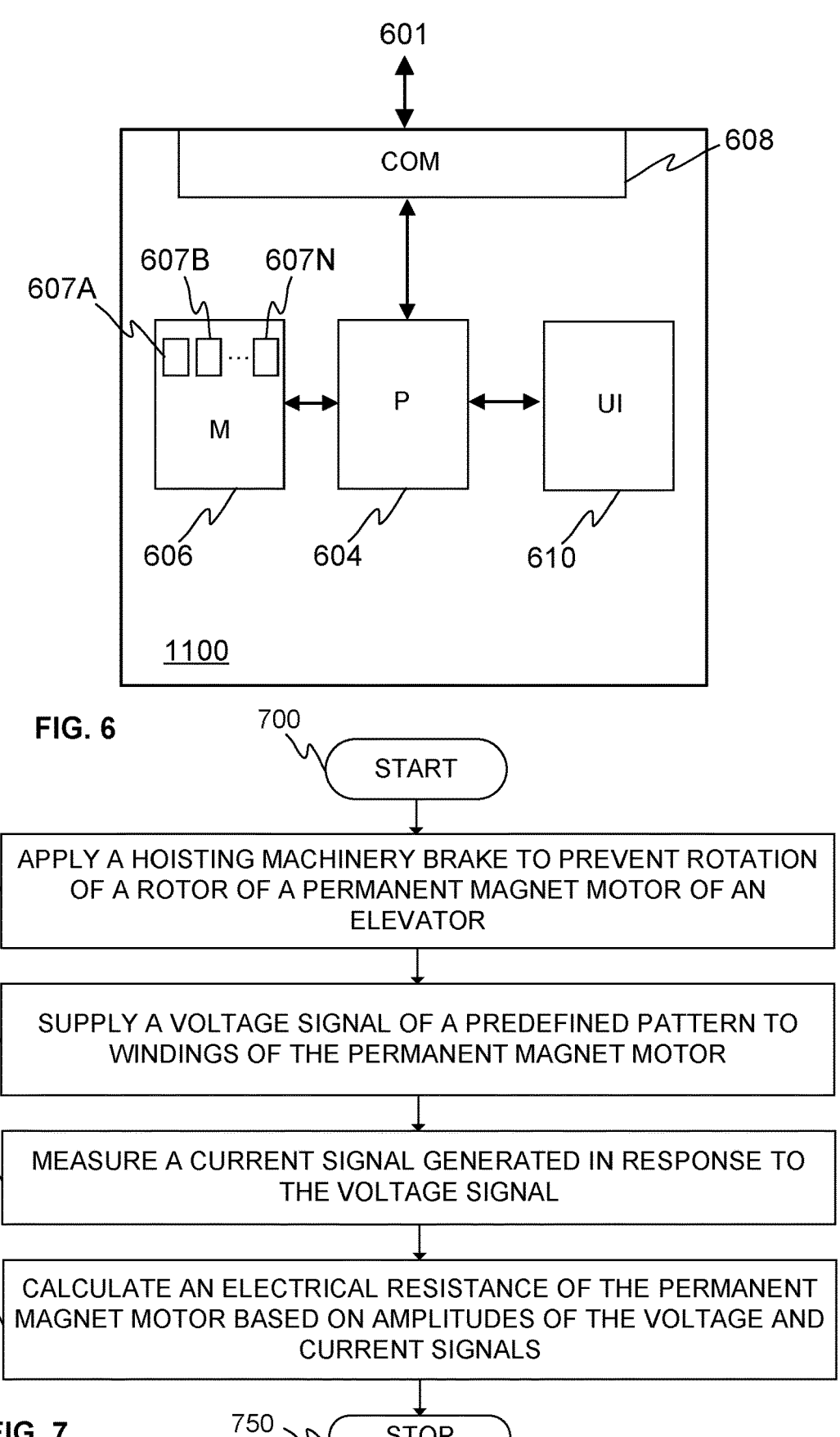

START

710 APPLY A HOISTING MACHINERY BRAKE TO PREVENT ROTATION OF A ROTOR OF A PERMANENT MAGNET MOTOR OF AN ELEVATOR

720 SUPPLY A VOLTAGE SIGNAL OF A PREDEFINED PATTERN TO WINDINGS OF THE PERMANENT MAGNET MOTOR

730 MEASURE A CURRENT SIGNAL GENERATED IN RESPONSE TO THE VOLTAGE SIGNAL

740 CALCULATE AN ELECTRICAL RESISTANCE OF THE PERMANENT MAGNET MOTOR BASED ON AMPLITUDES OF THE VOLTAGE AND CURRENT SIGNALS

750 STOP

FIG. 7

METHODS FOR IDENTIFYING AT LEAST ONE PARAMETER OF A PERMANENT MAGNET MOTOR OF AN ELEVATOR, ELEVATOR DRIVE UNITS, AND ELEVATORS

FIELD OF THE INVENTION

The present invention relates in general to commissioning of elevator motors. In particular, however not exclusively, the present invention concerns identifying parameters of a permanent magnet motor of an elevator.

BACKGROUND

Vector control, or field-oriented control, of permanent magnet motors requires use and thus knowledge of several motor parameters. In particular, accurate identification of motor resistance and motor inductance would be beneficial.

Motor parameters are traditionally been measured in the manufacturing phase of the motor. The motor parameters are then later manually inputted to the electrical drive unit on-site. Manual input of the motor parameters is time-consuming and contains the risk of human error.

General purpose parameter identification methods adopted in commercial drive devices are intended to be used in free-rotating electric motors. However, these methods are not suitable for on-site elevator applications since the movement of the rotor is locked when elevator is being idle. The use of these methods for on-site elevator application would require hoisting ropes to be removed from the traction sheave before identification. Therefore, there is a need for on-site identification of elevator motor parameters with improved accuracy.

SUMMARY

An objective of the present invention is to provide methods for identifying at least one parameter of a permanent magnet motor of an elevator, elevator drive units, and elevators. Another objective of the present invention is that methods, elevator drive units, and elevators enable identifying the parameter of the motor even if the motor is already installed into its use as an elevator motor.

The objectives of the invention are reached by methods, an elevator drive unit, and an elevator as defined by the respective independent claims.

According to a first aspect, a method for identifying at least one parameter, such as a magnetization-axis and torque-axis inductances, and/or a resistance, of a permanent magnet motor of an elevator is provided. The method comprises at least the following steps:

applying, such as by a brake controller, at least one hoisting machinery brake to prevent rotation of a rotor of the permanent magnet motor, determining, by a first method, a mean value of motor inductance, as well as the magnetization-axis inductance and the torque-axis inductance as relative inductance values based on the mean value;

determining, by a second method, being different than the first method, a mean value of motor main inductances; and determining absolute values of the magnetization-axis and the torque-axis inductances based on the motor main inductance obtained by the second method and the relative inductance values obtained by the first method.

The first method may preferably comprise at least supplying a continuous excitation signal represented by an excitation vector having a constant amplitude and a constant frequency to the windings of the permanent magnet motor.

The second method may preferably comprises at least supplying a predetermined DC voltage to the windings of the permanent magnet motor for determining the mean value of the main inductances.

In an embodiment, the first method may comprise the following steps:

supplying, by an elevator drive unit, to the windings of the permanent magnet motor a continuous excitation signal, preferably a voltage signal, represented by an excitation vector having a constant amplitude and a constant frequency over at least one complete electrical cycle, such as an electrical angle changing from 0 to 360 degrees, of the motor, wherein the constant frequency is preferably the nominal frequency of the motor, recording, as a function of the electrical angle, a response signal represented by a response vector, preferably a current signal represented by a current vector, of the motor, calculating, based on the excitation signal and the recorded response signal, the mean value of motor inductance, and the magnetization-axis inductance and the torque-axis inductance.

In an embodiment, the second method may comprise the following steps:

i) supplying a predetermined DC voltage as a main voltage between two phases, such as between U and V, of the permanent magnet motor, ii) interrupting the DC voltage, measuring a rate of decrease of the motor current, and iii) determining a first main inductance based on the DC voltage and the rate of decrease of the motor current; and calculating other main inductances, such as a second main inductance, such as between V and W, and a third main inductance, such as between U and W, of the motor by repeating the method steps i)

iii) hereinabove for other pairs of phases, and calculating the mean value of the main inductances.

In some embodiments, the method further comprises, for example, being performed immediately prior to the method steps mentioned hereinabove:

applying, by the brake controller, the at least one hoisting machinery brake to prevent rotation of a rotor of the permanent magnet motor, supplying, by an elevator drive unit, a voltage signal of a predefined pattern to the windings of the permanent magnet motor, measuring, by the elevator drive unit, a current signal of the permanent magnet motor being generated in response to the voltage signal, and calculating, by the elevator drive unit, an electrical resistance of the permanent magnet motor based on amplitudes of the voltage signal and the current signal.

In some embodiments, the voltage signal may be arranged to increase with a predetermined ramp.

Furthermore, the measuring, by the elevator drive unit, of the current signal may be performed after a predetermined time, such as a first time period, has lapsed from starting of the supply of the voltage signal.

In some embodiments, the voltage signal is an initial part of the excitation signal and the current signal an initial part of the response signal, for example, when the calculation of the electrical resistance is performed immediately prior to said method steps as referred to hereinabove.

In an embodiment, the method may comprise applying, by the brake controller, at least two hoisting machinery brakes to lock movement of the rotor of the permanent magnet motor.

In various embodiments, the method may be performed on-site.

According to a second aspect, an elevator drive unit is provided. The elevator drive unit comprises an electrical converter unit, such as including an inverter, and a controller configured to operate the electrical converter unit for providing power signals having a variable voltage and variable frequency to the windings of a permanent magnet motor, wherein the controller is configured to cause the elevator drive unit to perform the method according to the first aspect.

According to a third aspect, an elevator is provided. The elevator comprises the elevator drive unit according to the second aspect. The elevator further comprises the permanent magnet motor arranged in a mechanical connection with an elevator car of the elevator, such as via a traction sheave and/or a hoisting rope or belt.

According to a further aspect, without regard to the first aspect, a method for identifying at least one parameter, such as a resistance, of a permanent magnet motor of an elevator is provided. The method comprises at least the following steps:

applying, by a brake controller, at least one hoisting machinery brake to prevent rotation of a rotor of the permanent magnet motor, supplying, by an elevator drive unit, a voltage signal of a predefined pattern to windings of the permanent magnet motor, measuring, by the elevator drive unit, a current signal of the permanent magnet motor being generated in response to the voltage signal, and calculating, by the elevator drive unit, an electrical resistance of the permanent magnet motor based on amplitudes of the voltage signal and the current signal.

According to still further embodiments in connection with the further aspect, an elevator drive and an elevator, without regard to the second and third aspects are provided. The elevator drive unit comprises an electrical converter unit, such as including an inverter, and a controller configured to operate the electrical converter unit for providing power signals having a variable voltage and variable frequency to the windings of a permanent magnet motor, wherein the controller is configured to cause the elevator drive unit to perform the method according to the further aspect. Furthermore, the elevator comprises such an elevator drive unit. The elevator further comprises the permanent magnet motor arranged in a mechanical connection with an elevator car of the elevator, such as via a traction sheave and/or a hoisting rope or belt.

The present invention provides methods, elevator drive units, and elevators for identifying at least one parameters, such as a magnetization-axis and torque-axis inductances, and/or a resistance, of a permanent magnet motor of an elevator. The present invention provides advantages over known solutions such that the elevator commissioning is faster and thus economically cheaper when motor identification can be done with hoisting ropes installed on the motor traction sheave. Another advantage is that it is possible to produce torque during the identification since the rotor is locked.

Various other advantages will become clear to a skilled person based on the following detailed description.

The expression "a number of" may herein refer to any positive integer starting from one (1).

The expression "a plurality of" may refer to any positive integer starting from two (2), respectively.

The terms "first", "second" and "third" are herein used to distinguish one element from other element, and not to specially prioritize or order them, if not otherwise explicitly stated.

The exemplary embodiments of the present invention presented herein are not to be interpreted to pose limitations to the applicability of the appended claims. The verb "to comprise" is used herein as an open limitation that does not exclude the existence of also unrecited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

FIG. 4 shows a flow diagram of a method according to an embodiment of the present invention.

FIG. 5 presents schematically examples of signal waveforms related to a method according to an embodiment of the present invention.

FIG. 6 presents schematically an example of a controller comprised in an elevator drive unit according to an embodiment of the present invention.

FIG. 7 shows a flow diagram of a method according to an embodiment of the present invention.

DETAILED DESCRIPTION OF SOME EMBODIMENTS

Figure 1:
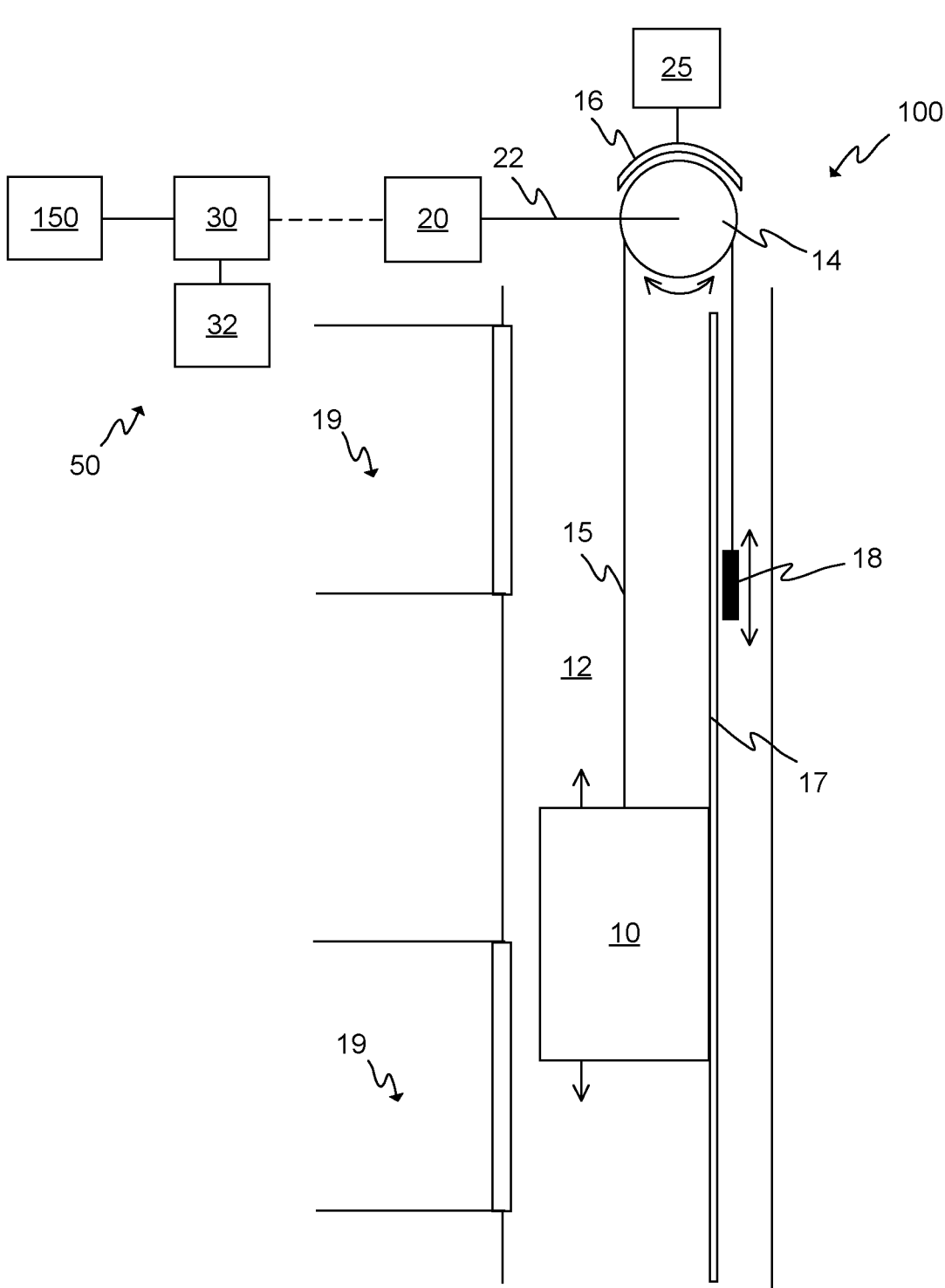
FIG. 1 illustrates schematically an elevator according to an embodiment of the present invention.

FIG. 1 illustrates schematically an elevator 100 according to an embodiment of the present invention. The elevator 100 may comprise an elevator car 10 arranged to be moved in an elevator shaft 12. The moving of the elevator car 10 may be implemented, preferably, by a hoisting rope or belt 13 in connection with a traction sheave 14 or the like. Furthermore, the elevator 100 may comprise a permanent magnet motor 20, such as an axial flux permanent magnet synchronous machine or a radial flux permanent magnet synchronous machine, arranged to operate, such as rotate, the traction sheave 14 for moving the elevator car 10. The traction sheave 14 may be connected, via a mechanical connection 22, directly or indirectly via a gear to a shaft of the motor 20. The elevator 100 may comprise a machine room or be machine roomless, such as have the motor 20 in the elevator shaft 12.

The elevator 100 may preferably comprise at least one hoisting machinery brake 16 configured for resisting or, preferably, preventing the movement of the permanent magnet motor 20, that is the rotor thereof, directly or via the traction sheave 14 or components thereof and/or therebetween. Furthermore, the elevator 100 may comprise a brake controller 25 configured to operate at least one of the at least one hoisting machinery brake 16. The brake controller 25 may further be in connection with other elements of the elevator 100, such as an elevator control unit and/or a controller 32 as described hereinbelow. The brake controller 25 may comprise an actuator (not shown) for operating the brake 16 or at least be in connection with such an actuating device.

There may additionally be, at least in some embodiments, a counterweight 18 arranged in connection with the elevator car 10 such as is known to a person skilled in the art of elevators. Still further, the elevator 100 may additionally comprise a guide rail 17 or rails 17 arranged into the elevator shaft 12 for guiding the movement of the elevator car 10.

The elevator 100 of FIG. 1 further comprises an elevator drive unit 50. The elevator drive unit 50 may comprise an electrical converter unit 30, such as including an inverter or a frequency converter, for connecting to, and controlling the operation of, the permanent magnet motor 20, and a controller 32 in connection with the electrical converter unit 30, wherein the controller 32 is configured to operate the electrical converter unit 30 to provide electrical power (signals), such as having variable voltage and variable frequency, to the windings of the permanent magnet elevator motor 20. The controller 32 may be a separate controller device or be comprised in the electrical converter unit 30, for instance.

Still further, the elevator drive unit 50 may be arranged to be fed by an electrical power source 150, such as of the elevator 100, for example from an external electrical power grid, or another power source 150, for example, a battery system. Additionally, the electrical power source 150 may intake electrical power from the elevator drive unit 50.

In various embodiments, the controller 32 may be configured to perform one or several or all of the method steps according to an embodiment of the present invention as will be described hereinafter.

The elevator 100 preferably comprises landing floors 19 and, for example, landing floor doors and/or openings, between which the elevator car 10 is arranged to be moved during normal operation of the elevator 100, such as to move persons and/or items between said floors 19.

Figure 2:
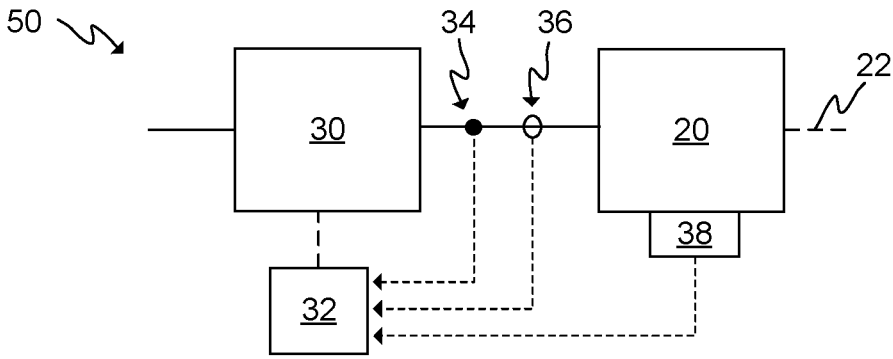
FIG. 2 illustrates schematically an elevator drive unit according to an embodiment of the present invention.

FIG. 2 illustrates schematically an elevator drive unit 50 according to an embodiment of the present invention. The elevator drive unit 50 comprises an electrical converter unit 30, such as including an inverter or a frequency converter, for connecting to, and controlling the operation of, the permanent magnet motor 20, and a controller 32 in connection with the electrical converter unit 30, wherein the controller 32 is configured to operate the electrical converter unit 30 to provide electrical power (signals), such as having variable voltage and variable frequency, to the windings of the permanent magnet motor 20 for rotating the rotor of the motor 20 and thus for moving the elevator car 10. The controller 32 may be a separate controller device or be comprised in the electrical converter unit 30.

In various embodiments, the elevator drive unit 50 may be comprise, and preferably the controller 32 is arranged in connection with, at least one of the following: at least one, preferably at least two, output voltage measurement device 34 for measuring output voltage(s) of the electrical converter unit 30, at least one, preferably at least two, output current voltage measurement device 36 for measuring output current(s) of the electrical converter unit 30. This/these measurement device(s) 34, 36 may basically be any known measurement devices suitable for measuring said voltage(s) or current(s). In some embodiments, the elevator drive unit 50 may comprise at least two, preferably, at least three, output current measurement devices 36. Alternatively or in addition, the elevator drive unit 50 may comprise at least two, preferably, at least three, output voltage measurement devices 34. Instead of being arranged to the output phases of the drive unit 50, at least some of the output current measurement devices 36 and/or output voltage measurement devices 34 may be associated with the DC link, optionally of the input or intermediate circuit, of the elevator drive unit 50.

In various embodiments, the elevator drive unit 50 may comprise an equal number of output current measurement devices 36 relative to the number of phases in the motor 20.

In various embodiments, alternatively or in addition, the elevator drive unit 50 may comprise an equal number of output voltage measurement devices 34 relative to the number of phases in the motor 20.

In various embodiments, the elevator drive unit 50, such as the controller 32 thereof, may be configured to receive information about a status of the hoisting machinery brake 16, that is whether it is in a braking state or an open state. Alternatively, the elevator drive unit 50, such as by the controller 32 thereof, may be configured to be able to control the status of the hoisting machinery brake 16, such as by providing a brake control signal to a brake controller 25 or to a hoisting machinery brake actuator.

In addition, the elevator drive unit 50 may be comprise, preferably the controller 32 being arranged in connection with, a motor speed measurement device 38, such as having a rotary encoder mounted to the rotor of the permanent magnet motor 20 for measuring the rotating speed and/or the position of the rotor.

Figure 3A:
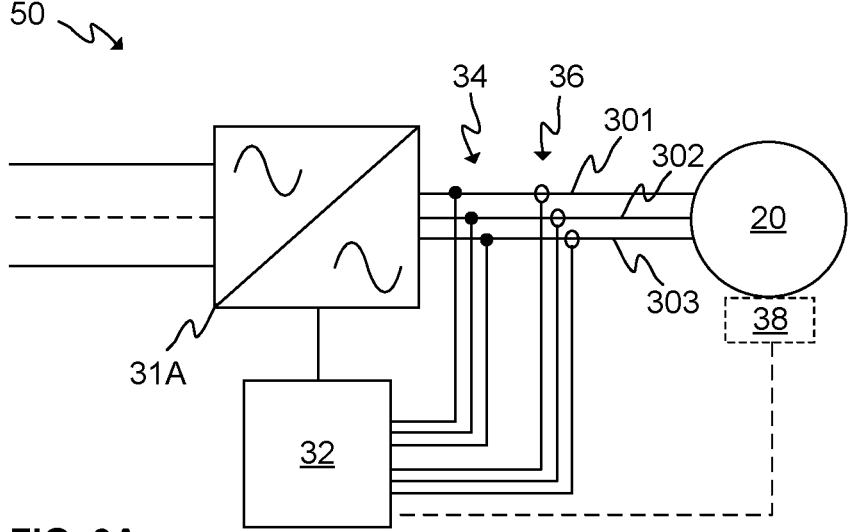
FIGS. 3A and 3B illustrate schematically elevator drive units according to some embodiments of the present invention.
Figure 3B:
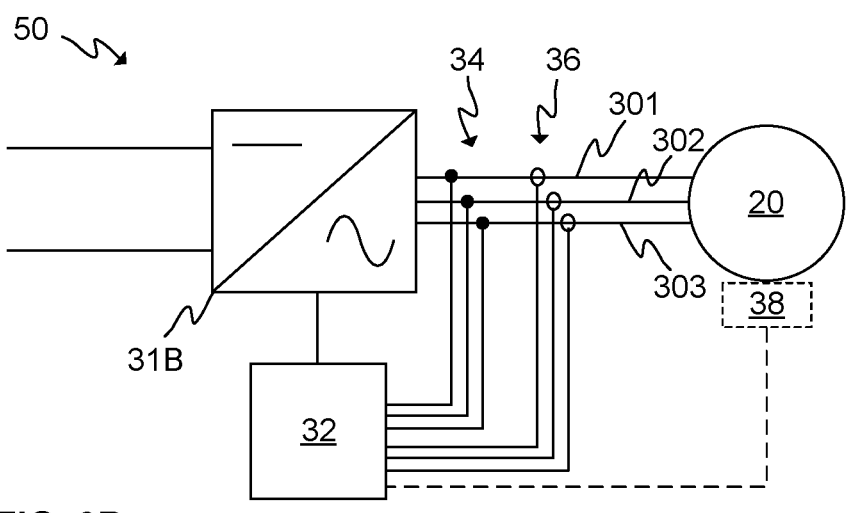

FIGS. 3A and 3B illustrate schematically elevator drive units 50 according to some embodiments of the present invention. In FIGS. 3A and 3B, as well as in various other embodiments of the present invention, the motor 20 is a three-phase permanent magnet motor having phases U 301, V 302, and W 303.

In FIG. 3A, the elevator drive unit 50 comprises the electrical converter unit 30 which may be a frequency converter 31A which input may be connected to the electrical power source 150, in this case a single-phase, a two-phase or a three-phase electrical grid, and its output to the permanent magnet motor 20 of the elevator 100. The optional phase in case of having two or three phases is shown with dashed line in FIG. 3A.

The frequency converter 31A may be capable of converting, for example, a voltage and/or a current having a first frequency to a voltage and/or current with a second frequency, wherein the amplitudes of the converted signals and/or the second frequency is the same or different with respect to the first frequency. The frequency converter 31A may comprise a rectifier phase capable of operating in one or more quadrants. The rectifier phase may be capable of converting the alternating current (AC) voltages and currents of the electrical power source into direct current (DC) currents and DC voltages in DC link, optionally of the intermediate circuit, of the frequency converter. The frequency converter 31A may also comprise an inverter phase capable of converting the DC voltages or currents into AC voltages or currents, thus controlling the operation of the permanent magnet motor 20, and capable of operating in one or more quadrants. There may also be an intermediate circuit connected between the rectifier and inverter phases. The intermediate circuit may comprise an electrical storage element such as a capacitor or an inductor for smoothing a DC voltage or current, and at least temporarily storing electrical energy therein.

In the embodiment of FIG. 3B, the elevator drive unit 50 comprises the electrical converter unit 30 which may be an inverter 31B. The inverter 31B may be capable of converting the DC voltages or currents into AC voltages or currents, thus controlling the operation of the permanent magnet motor 20, and capable of operating in one or more quadrants. There may also be an input circuit connected to the DC link of the inverter 31B. The input circuit may comprise an electrical storage element such as a capacitor or an inductor for smoothing a DC voltage or current, and at least temporarily storing electrical energy therein. The inverter 31B may be fed electrical power from a DC source or by a rectifier or from a battery (bank).

FIG. 4 shows a flow diagram of a method according to an embodiment of the present invention.

Step 400 may refer to a start-up phase of the method. Suitable equipment and components are, preferably, obtained and systems assembled and configured for operation. This may include, for example, performing one or several of installing the motor 20, at least one hoisting machinery brake 16, a traction sheave 14, a hoisting rope(s) 15, as well as configuring them for operation.

Step 410 may refer to applying, such as by a brake controller 25, at least one hoisting machinery brake 16 to prevent rotation of the rotor of the permanent magnet motor 20 of the elevator 100. In an embodiment, the applying may comprise applying at least two hoisting machinery brakes 16 to lock movement of the rotor of the permanent magnet motor 20.

Said preventing may refer, at least in some embodiments, to applying the brake 16 by such as a force that the rotor remains substantially stationary at least during performing of portions of the method including applying of an excitation signal to the windings of the motor 20 and determining, such as by measuring, a response signal generated in response to the excitation signal. The absolute value of the magnitude of the force depends on the brake 16 and operating conditions of the elevator 100.

Step 420 may refer to determining, by a first method, a mean value of motor inductance, as well as a magnetization-axis, such as direct or d-axis, and a torque-axis, such as quadrature or q-axis, inductances as relative inductance values based on the mean value.

Also, inductance values may be determined with several different current values and then the inductance L used in vector control may be represented as a function of motor current (for example as a table memorized in vector control or as a function motor current i: L(i)).

In a preferable embodiment, the first method comprises at least supplying, continuously for at least a first time period, an excitation signal defined by an excitation vector to the windings of the permanent magnet motor 20. The excitation vector may preferably have a constant amplitude and a constant frequency.

In an embodiment, the first method may comprise supplying, preferably by an elevator drive unit 50, to the windings of the permanent magnet motor 20 the excitation signal, preferably a continuous voltage signal represented by an excitation vector of a constant amplitude and a constant frequency, over at least one complete electrical cycle of the motor 20, in this case the first time period, wherein the constant frequency is preferably the nominal frequency of the motor 20. In addition, the method may further comprise recording, as a function of electrical angle, a response signal defined by a response vector, preferably a current signal, of the motor 20. Still further, the method may comprise calculating, based on the excitation signal and the recorded response signal, a mean value of the motor inductance, and a magnetization-axis inductance and a torque-axis inductance.

Step 430 may refer to determining, by a second method, being different than the first method, a mean value of motor main inductances.

In a preferable embodiment, the second method comprises at least supplying a predetermined DC voltage to the windings of the permanent magnet elevator. In the method, based on the predetermined DC voltage, the mean value of the main inductances may be determined.

In an embodiment, the second method may comprise supplying a predetermined DC voltage, for example, for at least a second time period, as a main voltage between two phases, such as between U 301 and V 302, V 302 and W 303, or U 301 and W 303, of the permanent magnet motor 20. The method may further comprise interrupting the DC voltage, such as after the second time period, and measuring the rate of decrease of the motor current. Optionally, the main voltage is configured to be applied such that the generated current corresponds to the nominal current of the motor 20. Still further, the method may comprise determining the main inductance by means of the DC voltage and the rate of decrease of the motor current, for example, based on the time during which the current decreases from the nominal value or peak value to about 60 percent of the nominal or peak value, and on the magnitude of the current change.

In some embodiments, the inductance may then be calculated based on equation: inductance=0.5*(change in current/time required for the change) because there are two inductances in series when utilizing a main voltage as an excitation signal.

The method may then comprise calculating all three main inductances by repeating above steps for the other two main voltages. Finally, the method may comprise calculating mean value of the main inductances based on the determined main inductances.

The order of performing steps 420 and 430 may vary depending on the embodiment. In various embodiments, step 420 may be performed before step 430.

Step 440 may refer to determining absolute values of the magnetization-axis and the torque-axis inductances by means of the motor main inductances obtained by the second method as well as the relative inductance values obtained by the first method.

Method execution may be stopped at step 450. The identification of the relevant inductance values of the motor 20 has been concluded by utilizing the first and the second methods.

In various embodiments, the inductance values may be current dependent (because of saturation of motor iron core etc.) and therefore substantially similar current values are, preferably, used for both the first and second methods for determining the inductances.

Alternatively or in addition, the inductance values may be determined with several different current values and then the inductance used in the vector control method may be represented as a function of motor current (for example, as a table memorized in the vector control and/or as a function of the motor current).

In various embodiments, the method may be performed on-site. In general, this may entail that the rotor of the motor 20 is unable to rotate freely. For example, the hoisting rope may be attached to traction sheave 14 and the elevator car 10 and, thus, the rotor of the motor 20 is unable to rotate freely.

In various embodiments, the method may in addition comprise supplying, by an elevator drive unit 50 and after the application of the brake(s) 16, a second excitation signal, in this case, a voltage signal of a predefined pattern, to the windings of the permanent magnet motor 20. Still further, the method may comprise measuring, by the elevator drive unit 50, a second response signal, in this case a current signal, of the permanent magnet motor 20 being generated in response to the second excitation signal. In addition, the method may comprise calculating, by the elevator drive unit 50, the electrical resistance of the permanent magnet motor 20 based on amplitudes of the second excitation and second response signals, that is, in this case, the voltage signal and the current signal.

In some embodiments, the voltage signal may be arranged to be supplied with a predetermined ramp such as the magnitude of the voltage increases according to the ramp. Furthermore, the method may comprise measuring, by an elevator drive unit 50, the current signal after a predetermined time, such as a first time period as shown in FIG. 5, has lapsed from starting supply of the voltage signal.

FIG. 5 presents schematically examples of signal waveforms related to a method according to an embodiment of the present invention. In FIG. 5, the horizontal axis 101 represents time. The vertical axis 102 represents either an amplitude of a voltage or current vector, or an electrical angle of the motor 20.

It should be noted that the waveforms in FIG. 5 are produced in conditions in which the rotor of the motor 20 is locked, such as being prevented from rotating by the hoisting machinery brake 16.

In FIG. 5, the amplitude of voltage 110 as a function of time is shown. The voltage 110, as a voltage vector, is supplied, preferably with a slope, to the windings of the motor 20 in accordance with an embodiment of the present invention. In response to the voltage 110, a current 112 is being generated in the windings of the motor 20. The amplitude of the current vector of the current 112 is shown in FIG. 5 as a function of time. At a first time instance 105, that is after a first time period from the beginning of supplying of the voltage, the current 112 has reached a steady-state current value. Optionally, based on the magnitudes of voltage 110 and current 112 at the first time instance, the resistance of the windings may be determined based on Ohm's Law, that is R=U/I.

In accordance with an embodiment of the present invention, such as in accordance with FIG. 5, in the first method, by means of the elevator drive unit 50, the voltage vector (according to the voltage 110), having a substantially constant amplitude and constant frequency, is supplied, preferably continuously, to the windings of the permanent magnet elevator motor 20 after the steady-state condition has been reached, such as after the first time instance 105 in FIG. 5. The constant frequency of the voltage vector is preferably the nominal frequency of the motor 20, such that based on the first method, the identified value(s) of inductance(s) will correspond to the those in normal operating conditions of the motor 20. Said voltage vector is supplied over at least one complete electrical cycle of the motor 20, that is to cover 360 electrical degrees of the motor 20. This can be seen in FIG. 5, in which the control signal 114, representing the electrical angle of the motor 20, changes from zero to its maximum value which is, in this case, 360 degrees.

Rotating voltage vector (according to the voltage 110) causes response current vector (according to the current 112) in the windings of the motor 20. The voltage vector and the response current vector may be observed in a rotating d-q coordinate system (having herein a reference to the known direct-quadrature-zero transformation by Robert H. Park). The response current (vector) 112 may be recorded as a function of the electrical angle of the motor 20. The amplitude of the response current vector (see current 112) varies because motor inductance depends on the electrical angle of the motor 20, for example, substantially by $U=j*\omega*L(\theta)*I$, or, if the resistance of the windings is known, then more accurately by $U=R*I+j*\omega*L(\theta)*I$, where U is the voltage 110 over the windings, $\omega$ the angular frequency, I the current 112, and, optionally, R the resistance of the windings.

From said recording of the response current vector, all the other values are known, therefore the motor inductance $L(\theta)$ can be determined. In practice, mean value of the motor inductance, as well as magnetization-axis and torque-axis inductances may be determined. Said inductances may be determined as relative values with respect to the mean value. They do vary, however, due to saturation and geometry of the magnetic core.

Next, in accordance with various embodiments, the motor inductance may be determined with a different method, that is, herein the second method. The second method may comprise supplying a predetermined DC voltage as a main voltage to three main phases U-V, V-W; U-W. The second method then comprises interrupting the supplied DC voltage. After the interruption, the motor current starts to decrease with a given time constant, substantially in accordance with L/R. In the second method, the time constant may be determined for all three main phases, and thereby the main inductances are solved by means of the time constants. In some embodiments, the value of resistance may be utilized for more accurate determination of the main inductances. The mean value of the main inductances may then be calculated.

In various embodiments, the resistance may be utilized to improve the accuracy of the identification of the inductances.

Furthermore, in the method according to an embodiment of the present invention, the magnetization-axis, or d-axis, and torque-axis, or q-axis, inductances may further be calculated by using the mean value of the main inductances (as calculated in the second method) and the relative values calculated in the first method.

In order to further make the method more accurate, the method may comprise determining several inductance values with several different voltage and current values to incorporate the saturation effect of the magnetic circuit of the motor 20. Inductance-current value pairs may be stored in memory, or a graph fit as a function of current may be determined for the inductances. These refined inductance values may be utilized to improve accuracy of vector control of the motor 20.

With respect to FIG. 5 and the related description hereinabove, a voltage vector was described to be used as an excitation signal and a current vector as a response signal. In various embodiments, however, a current vector may be used as an excitation signal and a voltage vector as a response signal for identifying the inductances and, optionally, the resistance of the windings of the motor 20.

FIG. 6 illustrates schematically a controller 32 according to an embodiment of the present invention. External units 601 may be connected to a communication interface 608 of the controller 32. External unit 32 may comprise wireless connection or a connection by a wired manner. The communication interface 608 provides interface for communication with external units 601 such as the brake controller 25 and/or an elevator control unit. There may also be connecting to the external system, such as a laptop or a handheld device. There may also be a connection to a database of the elevator 100 or an external database including information used in controlling the operation of the elevator 100.

The controller 32 may comprise one or more processors 604, one or more memories 606 being volatile or non-volatile for storing portions of computer program code 607A-607N and any data values and possibly one or more user interface units 610. The mentioned elements may be communicatively coupled to each other with e.g. an internal bus.

The processor 604 of the controller 32 may at least be configured to implement at least some method steps as described hereinabove. The implementation of the method may be achieved by arranging the processor 604 to execute at least some portion of computer program code 607A-607N stored in the memory 606 causing the processor 604, and thus the controller 32 and/or the elevator drive unit 50, to implement one or more method steps as described. The processor 604 is thus arranged to access the memory 606 and retrieve and store any information therefrom and thereto. For sake of clarity, the processor 604 herein refers to any unit suitable for processing information and control the operation of the controller 32, among other tasks. The operations may also be implemented with a microcontroller solution with embedded software. Similarly, the memory 606 is not limited to a certain type of memory only, but any memory type suitable for storing the described pieces of information may be applied in the context of the present invention.

FIG. 7 shows a flow diagram of a method according to an embodiment of the present invention, especially related to identification of the resistance of the motor 20, that is with or without identifying the inductance(s) of the motor 20.

Step 700 may refer to a start-up phase of the method. Suitable equipment and components are, preferably, obtained and systems assembled and configured for operation. This may include, for example, performing one or several of installing the motor 20, at least one hoisting machinery brake 16, a traction sheave 14, a hoisting rope(s) 15, as well as configuring them for operation.

Step 710 may refer to applying, such as by a brake controller 25, at least one hoisting machinery brake 16 to prevent rotation of a rotor of the permanent magnet motor 20.

Said preventing may refer, at least in some embodiments, to applying the brake 16 by such as a force that the rotor remains substantially stationary at least during performing of portions of the method including applying of an excitation signal to the windings of the motor 20 and determining, such as by measuring, a response signal generated in response to the excitation signal. The absolute value of the magnitude of the force depends on the brake 16 and operating conditions of the elevator 100.

Step 720 may refer to supplying, such as by an elevator drive unit 50, a voltage signal of a predefined pattern to windings of the permanent magnet motor 20. The predefined pattern may be, for example, a ramp of increasing voltage.

In a preferable embodiment, the first method comprises at least supplying, continuously for at least a first time period, the voltage signal to the windings of the permanent magnet motor 20.

In some embodiments, the voltage signal may be supplied between two phases, that is, as a main voltage. The electrical converter unit 30 may be configured to control operation thereof, such as switches thereof, such that the third phase is isolated from said two phases or not active, that is, no current is allowed to flow therein. The main voltage to be supplied is such that the current corresponds to 90 percent of the nominal current of the motor 20. Then, after the first time period, the resistance may be calculated based on the amplitudes or magnitudes of the voltage and current signals.

Step 730 may refer to measuring, such as by the elevator drive unit 50, a current signal of the permanent magnet motor 20 being generated in response to the voltage signal.

Step 740 may refer to calculating, such by the elevator drive unit 50 and/or by the controller 32, an electrical resistance of the permanent magnet motor 20 based on amplitudes of the voltage signal and the current signal.

Method execution may be stopped at step 750. The identification of the relevant resistance value of the motor 20 has been concluded.

The invention claimed is:

1. A method for identifying at least one parameter, including a magnetization-axis and a torque-axis inductances, of a permanent magnet motor of an elevator, the method comprising:

applying, by a brake controller, at least one hoisting machinery brake to prevent rotation of a rotor of the permanent magnet motor;

determining, by a first method, a mean value of motor inductance, as well as the magnetization-axis inductance and the torque-axis inductance as relative inductance values based on the mean value;

determining, by a second method, being different than the first method, a mean value of motor main inductances, the motor main inductances being inductances between a first pair of phases of the permanent magnet motor; and determining absolute values of the magnetization-axis and the torque-axis inductances based on the motor main inductance obtained by the second method and the relative inductance values obtained by the first method.

2. The method according to claim 1, wherein the first method comprises at least supplying a continuous excitation signal represented by an excitation vector having a constant amplitude and a constant frequency to windings of the permanent magnet motor.

3. The method according to claim 2, wherein the second method comprises at least supplying a predetermined DC voltage to the windings of the permanent magnet motor for determining the mean value of the main inductances.

4. The method according to claim 2, wherein the first method comprises:

supplying, by an elevator drive unit, to the windings of the permanent magnet motor a continuous excitation signal represented by an excitation vector having a constant amplitude and a constant frequency over at least one complete electrical cycle of the motor, wherein the constant frequency is the nominal frequency of the motor;

recording, as a function of the electrical angle, a response signal represented by a response vector of the motor; and calculating, based on the excitation signal and the recorded response signal:

the mean value of motor inductance; and the magnetization-axis inductance and the torque-axis inductance.

5. The method according to claim 2, wherein the second method comprises:

i) supplying a predetermined DC voltage as a main voltage between two phases of the permanent magnet motor;

ii) interrupting the DC voltage, measuring a rate of decrease of the motor current;

iii) determining a first main inductance based on the DC voltage and the rate of decrease of the motor current;

calculating other main inductances of the motor by repeating the method steps i)-iii) for other pairs of phases of the permanent magnet motor; and calculating the mean value of the main inductances.

6. The method according to claim 1, wherein the second method comprises at least supplying a predetermined DC voltage to windings of the permanent magnet motor for determining the mean value of the main inductances.

7. The method according to claim 6, wherein the first method comprises:

supplying, by an elevator drive unit, to the windings of the permanent magnet motor a continuous excitation signal represented by an excitation vector having a constant amplitude and a constant frequency over at least one complete electrical cycle of the motor, wherein the constant frequency is the nominal frequency of the motor;

recording, as a function of the electrical angle, a response signal represented by a response vector of the motor; and calculating, based on the excitation signal and the recorded response signal:

the mean value of motor inductance; and the magnetization-axis inductance and the torque-axis inductance.

8. The method according to claim 6, wherein the second method comprises:

i) supplying a predetermined DC voltage as a main voltage between two phases of the permanent magnet motor;

ii) interrupting the DC voltage, measuring a rate of decrease of the motor current;

iii) determining a first main inductance based on the DC voltage and the rate of decrease of the motor current;

calculating other main inductances of the motor by repeating the method steps i)-iii) for other pairs of phases; and calculating the mean value of the main inductances.

9. The method according to claim 1, wherein the first method comprises:

supplying, by an elevator drive unit, to windings of the permanent magnet motor a continuous excitation signal represented by an excitation vector having a constant amplitude and a constant frequency over at least one complete electrical cycle of the motor, wherein the constant frequency is the nominal frequency of the motor, recording, as a function of the electrical angle, a response signal represented by a response vector of the motor; and calculating, based on the excitation signal and the recorded response signal, signal:

the mean value of motor inductance; and the magnetization-axis inductance and the torque-axis inductance.

10. The method according to claim 1, wherein the second method comprises:

i) supplying a predetermined DC voltage as a main voltage between two phases of the permanent magnet motor;

ii) interrupting the DC voltage, measuring a rate of decrease of the motor current;

iii) determining a first main inductance based on the DC voltage and the rate of decrease of the motor current;

calculating other main inductances of the motor by repeating the method steps i)-iii) for other pairs of phases of the permanent magnet motor; and calculating the mean value of the main inductances.

11. The method of claim 1, further comprising:

applying, by the brake controller, the at least one hoisting machinery brake to prevent rotation of the rotor of the permanent magnet motor;

supplying, by an elevator drive unit, a voltage signal of a predefined pattern to windings of the permanent magnet motor;

measuring, by the elevator drive unit, a current signal of the permanent magnet motor being generated in response to the voltage signal; and calculating, by the elevator drive unit, an electrical resistance of the permanent magnet motor based on amplitudes of the voltage signal and the current signal.

12. The method according to claim 11, wherein the voltage signal is arranged to increase with a predetermined ramp.

13. The method according to claim 11, wherein the measuring, by the elevator drive unit, of the current signal is performed after a predetermined time has lapsed from starting of the supply of the voltage signal.

14. The method according to claim 1, wherein the method is performed on-site.

15. The method according to claim 1, comprising:

applying, by the brake controller, at least two hoisting machinery brakes to lock movement of the rotor of the permanent magnet motor.

16. The method according to claim 1, wherein the method comprises first performing the steps of:

applying, by the brake controller, the at least one hoisting machinery brake to prevent rotation of the rotor of the permanent magnet motor;

supplying, by an elevator drive unit, a voltage signal of a predefined pattern to windings of the permanent magnet motor;

measuring, by the elevator drive unit, a current signal of the permanent magnet motor being generated in response to the voltage signal; and calculating, by the elevator drive unit, an electrical resistance of the permanent magnet motor based on amplitudes of the voltage signal and the current signal, and then performing the steps of:

i) supplying a predetermined DC voltage as a main voltage between two phases of the permanent magnet motor;

ii) interrupting the DC voltage, measuring a rate of decrease of the motor current;

iii) determining a first main inductance based on the DC voltage and the rate of decrease of the motor current;

calculating other main inductances of the motor by repeating the method steps i)-iii) for other pairs of phases; and calculating the mean value of the main inductances.

17. The method according to claim 16, wherein the voltage signal is an initial part of the excitation signal and the current signal an initial part of the response signal.

18. An elevator drive unit comprising an electrical converter unit and a controller configured to operate the electrical converter unit for providing power signals having a variable voltage and variable frequency to windings of a permanent magnet motor, wherein the controller is configured to cause the elevator drive unit to perform the method according to claim 1.

19. An elevator comprising the elevator drive unit of claim 18, and further comprising the permanent magnet motor arranged in a mechanical connection with an elevator car of the elevator.

\* \* \* \* \*